UNITED STATES PATENT OFFICE.

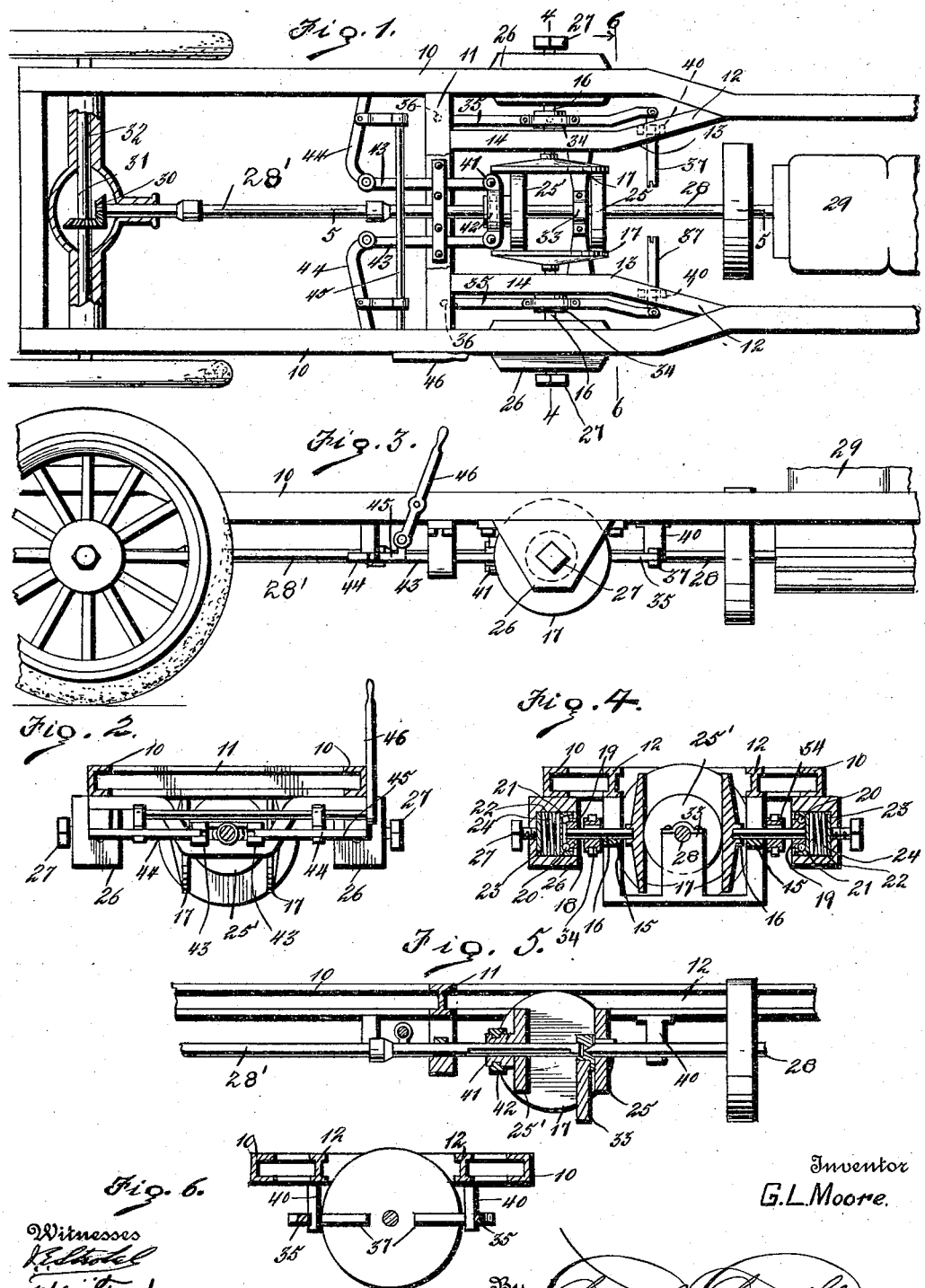

GEORGE L. MOORE, OF BIRMINGHAM, IOWA.

GEARING.

1,188,303.  Specification of Letters Patent.  Patented June 20, 1916.

Application filed September 23, 1912, Serial No. 721,883. Renewed December 7, 1915. Serial No. 65,636.

*To all whom it may concern:*

Be it known that I, GEORGE L. MOORE, a citizen of the United States, residing at Birmingham, in the county of Van Buren, State of Iowa, have invented certain new and useful Improvements in Gearing; and I do hereby declare the following to be a full, clear, and exact description of the invention, such as will enable others skilled in the art to which it appertains to make and use the same.

This invention relates to improvements in motor vehicles, and particularly to a driving gear therefor.

The principal object of the invention is to provide a simple device of this character whereby the driving wheels and the driven wheels are held in proper relation and in good frictional contact.

Another object is to provide simple means for throwing the same into and out of gear and changing the gear.

Other objects and advantages will be apparent from the following description and with particular reference to the accompanying drawings.

In the drawings: Figure 1 is a top plan view of a portion of a chassis of a vehicle showing the plan of my gearing, Fig. 2 is a rear elevation, Fig. 3 is a side elevation, Fig. 4 is a vertical transverse section on the line 4—4 of Fig. 1, Fig. 5 is a vertical longitudinal sectional view on the line 5—5 of Fig. 1, Fig. 6 is a vertical transverse sectional view on the line 6—6 of Fig. 1, looking in the direction of the arrows.

Referring particularly to the accompanying drawings, 10 represents the side bars of the chassis of the machine, 11 a transverse bar and 12 the supplemental bars which are connected to the side bars 10 and extend at angles as at 13 inwardly between the side bars and then extend rearwardly in parallel relation, as indicated at 14. Extending transversely of the bars 14 and mounted in suitable journals 15 are the shafts 16, one on either side, the inner end of each of the shafts 16 carrying a disk 17, while the opposite end is provided with a cone 18 which has the groove 19 forming a race for the anti-friction balls 20. These balls also roll in another ball race member 21 slidably mounted in a recess 22 in the brackets 26 on the side bars 10. A follower head 23 is arranged adjacent the ball race member 21.

Between the member 21 and the member 23 is a coil spring 24 said spring forcing the member 21 against the cone 18 and the balls 20 to force the shaft 16 inwardly and hold the disk firmly against the disks 25 and 25'.

Threaded through the bracket 26 is an adjusting screw 27 which bears against the member 23 to regulate the tension of the spring 24. The parts just described are similarly duplicated on the opposite side of the machine and this description serves for both, as they are identical in construction. The driving disk 25 is carried on the rear end of a longitudinal shaft 28, the opposite end of which is connected to the engine 29, while the rear end is provided with a cone-shaped end supported in a similarly formed socket in the bracket 33 carried by the bars 14 the middle portion of said bracket extending upwardly between the disk 17 so that the shaft may be in perfect alinement to hold the disk 25 in proper position between the disks 17. Mounted on each of the shafts 16 is a grooved block 34, said block being keyed to said shaft and rotatable therewith, a longitudinally extending lever 35 being provided with means engaging in the groove of said block and suitably pivoted to a cross bar at one end as indicated at 36. The opposite end of the lever 35 is pivotally connected to a sliding link 37 which is disposed transversely on the bar 12 and slides in bracket 40. The links 37 are operated in any well known manner (not shown). Extending rearwardly from and journaled in the bracket at its forward end is the shaft 28'. This shaft carries a pinion 30 on its rear end, for engagement with a similar pinion 31 carried by the rear axle 32. On the forward end of this shaft is slidably keyed the disk 25', this disk being disposed between and frictionally engaging the disks 17. A block 41, somewhat similar to the block 34, is mounted on the shaft 28' and has mounted in its grooves the cross member 42. To this member 42 are suitably pivoted the links 43 which are pivotally connected to the arms 44 said arms being pivoted on the sides of the side bars 10 and extending inwardly. Suitable connections 45 are made to a hand lever 46, so that the said block 41 may be actuated to slide the disk 25 across the faces of the disks 17, for changing the speed, as well as reversing the gear.

The construction and arrangement of the thrust bearings of the shaft 16 and the adjustments therefor provide very efficient means for positively retaining good frictional contact between the disks 17 and 25, the means for shifting the said shafts 16 being such that the release of the disks require shifting of a lever in one direction, and to reëstablish contact of the disks requires only the releasing of the lever, the springs 24 efficiently resetting the shaft to bring the disks again into contact.

What is claimed is:

1. In a gearing, a drive shaft having a conical end, a bracket having a socket member receiving the conical end, a driven shaft having one end also journaled in the bracket and disposed in alinement with the driving shaft, and means for transmitting motion from the driving to the driven shaft.

2. In a gearing, a suitable frame, a drive shaft and a driven shaft mounted in the frame, friction elements carried by the shafts, cups mounted in the frame at opposite sides of the driven shaft, an adjustable spring-pressed ball race mounted in each of the cups, cone members disposed within the ball races, shafts carried by the cone members, and transmission elements carried by the shafts for engaging with the said friction elements.

In testimony whereof, I affix my signature, in presence of two witnesses.

GEORGE L. MOORE.

Witnesses:
L. G. BOIES,
J. F. ANDERSON.

Copies of this patent may be obtained for five cents each, by addressing the "Commissioner of Patents, Washington, D. C."